United States Patent
Hara et al.

(10) Patent No.: US 10,126,505 B2
(45) Date of Patent: Nov. 13, 2018

(54) OPTICAL ELEMENT MODULE

(71) Applicant: Sumitomo Osaka Cement Co., Ltd, Tokyo (JP)

(72) Inventors: Tokutaka Hara, Tokyo (JP); Toshio Kataoka, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/893,742

(22) Filed: Feb. 12, 2018

(65) Prior Publication Data

US 2018/0284349 A1 Oct. 4, 2018

(30) Foreign Application Priority Data

Mar. 30, 2017 (JP) ................. 2017-067998

(51) Int. Cl.
*G02B 6/26* (2006.01)
*G02B 6/27* (2006.01)

(52) U.S. Cl.
CPC ........... *G02B 6/262* (2013.01); *G02B 6/2773* (2013.01)

(58) Field of Classification Search
CPC ......... G02B 6/262; G02B 6/2773; G02B 6/32
See application file for complete search history.

(56) References Cited

U.S. PATENT DOCUMENTS

| | | | | |
|---|---|---|---|---|
| 4,707,067 A | * | 11/1987 | Haberland | G02B 6/4204 257/E31.117 |
| 5,537,503 A | * | 7/1996 | Tojo | G02B 6/4207 385/147 |
| 6,607,309 B2 | * | 8/2003 | Kuhn | G02B 6/4204 385/88 |
| 7,374,346 B2 | * | 5/2008 | Tanaka | G02B 6/4209 385/47 |
| 7,817,205 B2 | * | 10/2010 | Schulte | G03B 5/02 348/335 |
| 8,437,068 B2 | * | 5/2013 | Maie | G02F 1/0136 359/279 |
| 9,726,839 B2 | * | 8/2017 | Shimura | G02B 6/4246 |

FOREIGN PATENT DOCUMENTS

JP 62019819 A * 1/1987
JP 2014199364 A 10/2014

* cited by examiner

*Primary Examiner* — Daniel Petkovsek

(74) *Attorney, Agent, or Firm* — Taft Stettinius & Hollister LLP

(57) ABSTRACT

An optical element module includes an optical modulation element having first and second optical modulator units, a polarization combining means for combining two modulated lights which are emitted from the first and second optical modulator units, by making planes of polarization orthogonally cross each other; a housing which houses the optical modulation element and the polarization combining means; and a lens holder which holds a collimating lens which is disposed between the polarization combining means and an optical fiber, with the lens holder further holding the optical fiber. The optical element module is configured by joining the housing and the lens holder together by welding. In the lens holder, an outer diameter of a welding place is smaller than an outer diameter of a part which holds the collimating lens.

1 Claim, 4 Drawing Sheets

OPTICAL ELEMENT MODULE

CROSS-REFERENCE TO RELATED APPLICATIONS

This application claims the benefit of Japanese Patent Application No. 2017-067998 filed Mar. 30, 2017, the disclosure of which is herein incorporated by reference in its entirety.

BACKGROUND OF THE INVENTION

Field of the Invention

The present invention relates to an optical element module and in particular, to an optical element module which is configured by joining a plurality of optical elements by laser welding.

Description of Related Art

In an optical communication field or an optical measurement field, an optical element module having an optical element such as an optical modulation element or a lens and configured of a plurality of optical elements is frequently used. The optical element module is manufactured by disposing the plurality of optical elements at predetermined positions and assembling the optical elements. However, a high accuracy is required for adjustment of the disposition position of the optical element at that time, and therefore, in many cases, optical axis deviation occurs.

Further, in many cases, each of the optical elements configuring the optical element module is housed in a housing or held by a holding member (for example, a holder) and the housings or the holding members are assembled by being joined together by welding. The holding member is generally formed of metal, and thus it is deformed by being subjected to thermal shrinkage due to heat which is applied during welding. Then, even if assembling is performed while performing adjustment such that optical axis deviation does not occur, the module is thermally deformed at the time of welding joining, and thus optical axis deviation occurs, thereby causing deterioration of optical characteristics, which becomes problematic.

In order to solve this problem, Japanese Laid-open Patent Publication No. 2014-199364 discloses a method of adjusting an optical axis by a joining step of joining a housing which houses an optical modulation element and a lens holder having a built-in collimating lens together by laser welding, and an adjustment step of finely adjusting the optical axis by performing laser welding around a joining place.

SUMMARY OF THE INVENTION

In the related art, as shown in FIG. 1, as a lens holder 2, a straight pipe-shaped lens holder is used. That is, a lens holder is used in which the outer diameter of a lens holding part 2a which holds a lens 4 coincides with the outer diameter of a joining place 8 to a housing 1 which houses an optical modulation element. The straight pipe-shaped lens holder 2 has a simple structure, and therefore, it can be manufactured at low cost.

The lens holder 2 is disposed at a predetermined site of the housing 1 (for example, a pedestal 11 protruding from the housing 1) with it being gripped by a lens chuck 7, and is fixedly joined to the housing 1 by performing welding by irradiation with a YAG laser in this state. At this time, if the lens holder 2 has a certain degree of outer diameter (holder diameter), the lens holder 2 can be stably gripped by the lens chuck 7, and therefore, it is possible to accurately perform the welding work and reduce positional deviation between components.

However, if the holder diameter is large, there is a problem in that optical axis mobility in an optical axis adjusting step is reduced. If an inclination angle (collimator inclination angle) of a center axis of the lens with respect to a normal optical axis (for example, an axis in a direction perpendicular to a housing surface) is set to be $\theta$, a holder diameter of the joining place to the housing is set to be D, and a shrinkage during the welding is set to be h, a relational expression, $\tan \theta = h/D$, is established. From this, it can be understood that the greater the holder diameter, the smaller the optical axis mobility becomes, and thus larger welding energy (YAG laser energy) is needed to adjust the optical axis.

In this manner, in the optical element module using the straight pipe-shaped lens holder, there is a problem in that it is difficult to secure the optical axis mobility at the time of adjustment welding while securing the holding ability of the lens holder.

An object of the present invention is to solve the above problem and provide an optical element module in which it is possible to improve optical axis mobility at the time of adjustment welding while securing the holding ability of a lens holder.

In order to solve the above problem, an optical element module according to the present invention has the following technical features.

(1) An optical element module includes: a housing which houses an optical modulation element; and a lens holder which holds a lens which is disposed between the optical modulation element and an optical fiber, and the optical fiber, and is configured by joining the housing and the lens holder together by welding, in which in the lens holder, an outer diameter of a joining place is smaller than an outer diameter of a part of the lens holder which holds the lens.

(2) In the optical element module according to the above (1), the optical modulation element includes first and second optical modulator units, the optical element module further includes polarization combining means for combining two modulated lights which are emitted from the first and second optical modulator units, by making planes of polarization orthogonally cross each other, and the polarization combining means is disposed in the housing.

According to the present invention, it is possible to provide an optical element module in which it is possible to improve optical axis mobility at the time of adjustment welding while securing the holding ability of a lens holder.

DETAILED DESCRIPTION OF THE INVENTION

Hereinafter, an optical element module according to the present invention will be described in detail.

Figure 2:
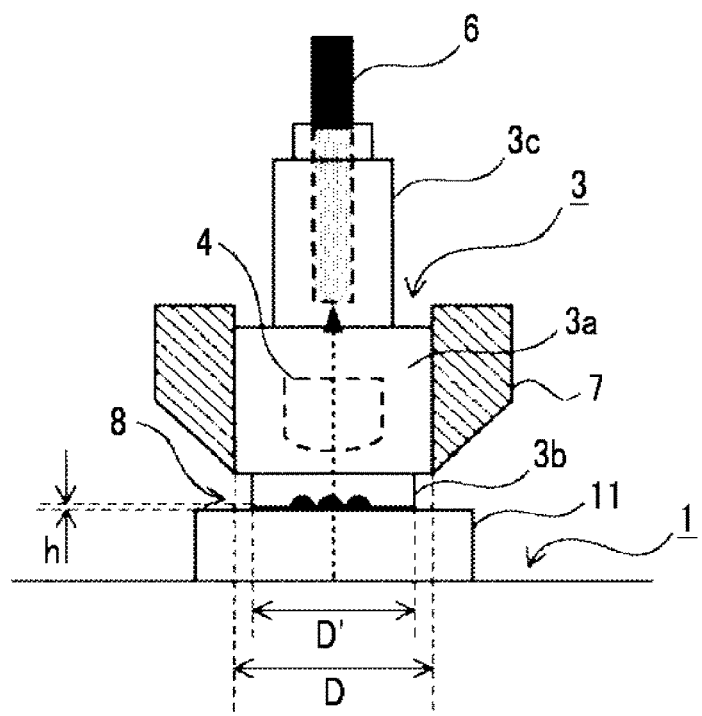
FIG. 2 is a diagram for explaining a lens holder of an optical element module according to an embodiment of the present invention.

In FIG. 2, a lens holder of an optical element module according to an embodiment of the present invention is shown.

The optical element module according to the embodiment of the present invention has a housing 1 which houses an optical modulation element, and a lens holder 3 which holds a lens 4 which is disposed between the optical modulation element and an optical fiber 6, and the optical fiber 6, and is configured by joining the housing 1 and the lens holder 3 together by welding. The welding between the housing 1 and the lens holder 3 is performed by irradiation with a YAG laser.

The feature of the present invention is that in the lens holder 3, the outer diameter of a joining place 8 to the housing 1 is smaller than the outer diameter of a lens holding part 3a that is a part which holds the lens 4.

The lens holder 3 has the built-in collimating lens 4 and has a structure in which light waves from the housing 1 side are condensed on the optical fiber 6 by the lens 4. The lens holder 3 has the lens holding part 3a that is a part which holds the lens 4, and a fiber holding part 3c that is a part which holds the optical fiber 6.

In the optical element module of this example, optical axis adjustment is performed by a joining step of joining the housing 1 and the lens holder 3 together by laser welding, and an adjustment step of finely adjusting the optical axis by performing laser welding around the joining place 8 to the housing 1.

Figure 1:
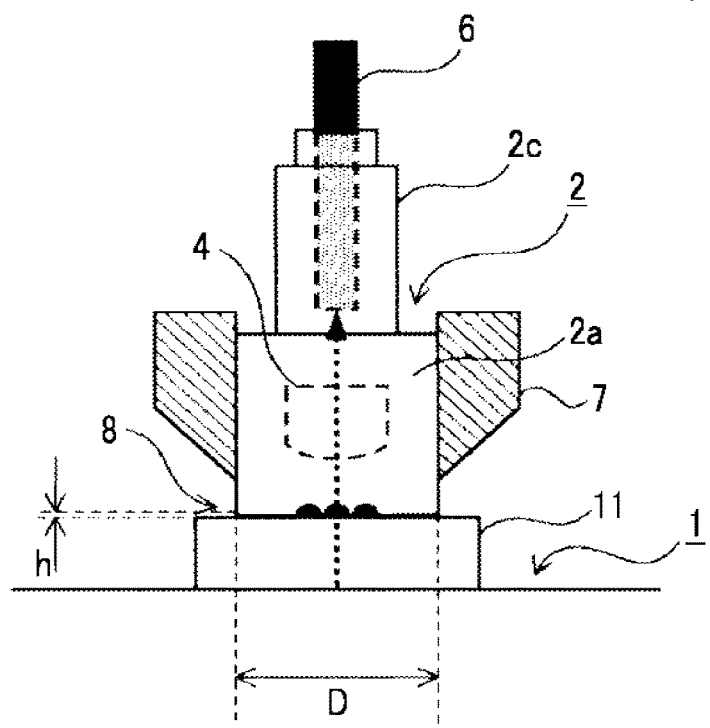
FIG. 1 is a diagram for explaining a lens holder of an optical element module according to the related art.

In the joining step, the lens holder 3 is fixedly joined to the housing 1 by disposing the lens holder 3 at a predetermined site of the housing 1 (for example, a pedestal 11 protruding from the housing 1) with the lens holder 3 being gripped by a lens chuck 7, and performing welding by irradiation with a YAG laser in this state. In the lens holder 3, the outer diameter (holder diameter) of a portion which is held by the lens chuck 7, that is, the lens holding part 3a, is not different from that in the related art (the lens holder 2 in FIG. 1), and therefore, the workability of the joining step is the same as that in the related art.

Here, in the joining step, by simultaneously irradiating positions, where stresses which are generated due to laser welding interfere with each other and cancel each other out, with two or more lasers, it is possible to suppress positional deviation between members to be joined.

Figure 3:
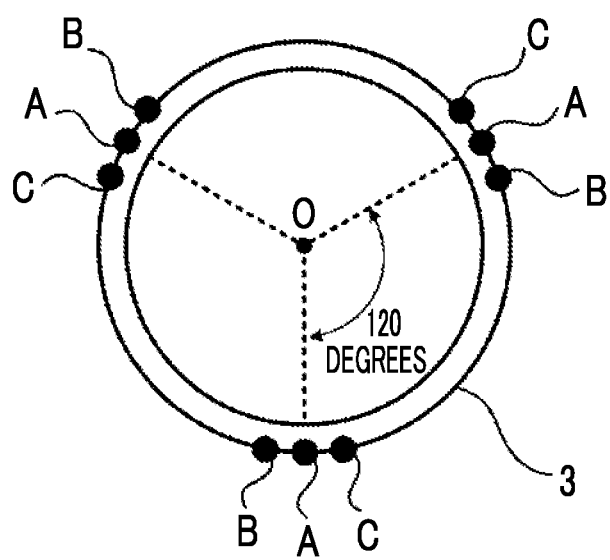
FIG. 3 is a diagram showing an example of a welding position to the lens holder of the optical element module according to the embodiment of the present invention.

FIG. 3 is a diagram of the joining place 8 in FIG. 2, as viewed in an optical axis direction, and shows an example of a welding position with respect to the lens holder 3. As shown in FIG. 3, three welding positions are disposed at an interval of 120 degrees, whereby the stresses generated due to the laser welding can be caused to interfere with each other so as to be uniformly applied to the entire joining portion. Even in a case where the laser welding positions are two or four or more, by disposing the welding positions so as to be symmetrical with respect to an axial center O of the lens holder 3, it is possible to suppress positional deviation between members to be joined.

In the laser welding, any form can be used, such as using a plurality of YAG lasers or using a single YAG laser by branching it. Further, in a case of increasing the number of welding positions, welding is performed by simultaneously irradiating three points indicated by symbol A in FIG. 3 (the three points are spaced apart from each other at regular intervals in a circumferential direction) with a laser. Subsequently, the positions of a laser irradiation device and the optical element module are deviated relative to each other and three points indicated by symbol B are then welded, and adjustment is performed in the same way and three points indicated by symbol C are then welded. During this welding work, it is preferable to monitor the emitted light of the optical element module and perform welding while adjusting the optical axis such that an optical loss is minimized.

In the adjustment step, the optical axis is adjusted by applying a pressing force to a part of the periphery of a joining surface. Stress is applied to a joining portion or the like due to the pressing force. However, welding is performed by irradiating a portion on the side opposite to the portion to which the pressing force is applied, which is a point in which the stress becomes compressive stress, with a laser. In this way, the stress is balanced, and thus it is possible to maintain a shape even if the pressing force is released.

In the adjustment step, it is possible to perform the fine adjustment of the optical axis many times so as to minimize a transmission loss. To this end, there is also a case where laser welding is performed a plurality of times for each portion.

Here, the lens holder 3 of this example has a reduced diameter part 3b provided between the lens holding part 3a and the joining place 8 to the housing 1. That is, the lens holder 3 has a stepped pipe shape in which the outer diameter of the joining place 8 is made relatively thin, and therefore, the optical axis mobility becomes larger than that in the related art. If an inclination angle (collimator inclination angle) of a center axis of the lens with respect to a normal optical axis (for example, an axis in a direction perpendicular to a housing surface) is set to be $\theta'$, a holder diameter of the joining place to the housing is set to be $D'$, and a shrinkage during welding is set to be $h$, a relational expression, $\tan \theta = h/D'$, is established. $D'$ is smaller than $D$ (here, $D$ is the holder diameter of the joining place in the lens holder of the related art), and therefore, $\theta'$ becomes larger than $\theta$, and thus it can be understood that the optical axis mobility increases as compared with that in the related art. For this reason, the optical axis adjustment work can be performed with small welding energy (YAG laser energy).

As the lens holder 3, it is favorable if the outer diameter of the joining place 8 is smaller than the outer diameter of the lens holding part 3a, and it is not limited to the lens holder having the stepped pipe shape as in this example. For example, as the lens holder 3, a lens holder may be used in which the reduced diameter part 3b has a shape which gently becomes thin linearly or curvilinearly, or the reduced diameter part 3b has a shape which becomes thin in a stepwise fashion with a plurality of steps.

As described above, in the optical element module of this example, the lens holder 3 in which the outer diameter of the joining place 8 is smaller than the outer diameter of the lens holding part 3a is used, and therefore, it is possible to improve the optical axis mobility at the time of adjustment welding while securing the holding ability of the lens holder 3. Therefore, it is possible to shorten the assembling time of the optical element module and to reduce internal accumulated stress due to the laser welding at the time of the optical axis adjustment, and thus cost reduction and improvement in reliability of the optical element module are attained.

Here, in the above description, a case where the outer diameter of the lens holding part 3*a* is smaller than the outer diameter of the pedestal 11, as shown in FIG. 2, has been taken as an example. However, it goes without saying that even in a case where the outer diameter of the lens holding part 3*a* is the same as or is larger than the outer diameter of the pedestal 11, the present invention can be applied. In this case, it is acceptable if the outer diameter of the reduced diameter part 3*b* (the outer diameter of the end portion on the joining place 8 side) is smaller than the outer diameter of the pedestal 11.

Further, in the above description, a case where the lens holder 3 is joined to the pedestal 11 of the housing 1 has been taken as an example. However, it is not necessarily necessary for the housing 1 to have the pedestal 11, and it is acceptable if a site where the lens holder 3 is mounted on the housing 1 is determined in advance.

Next, as an example of the optical element module, an optical element module will be described in which an optical modulation element provided with first and second optical modulator units, and polarization combining means for combining two modulated lights which are emitted from the first and second optical modulator units by making planes of polarization orthogonally cross each other are housed in the housing 1.

Figure 4:
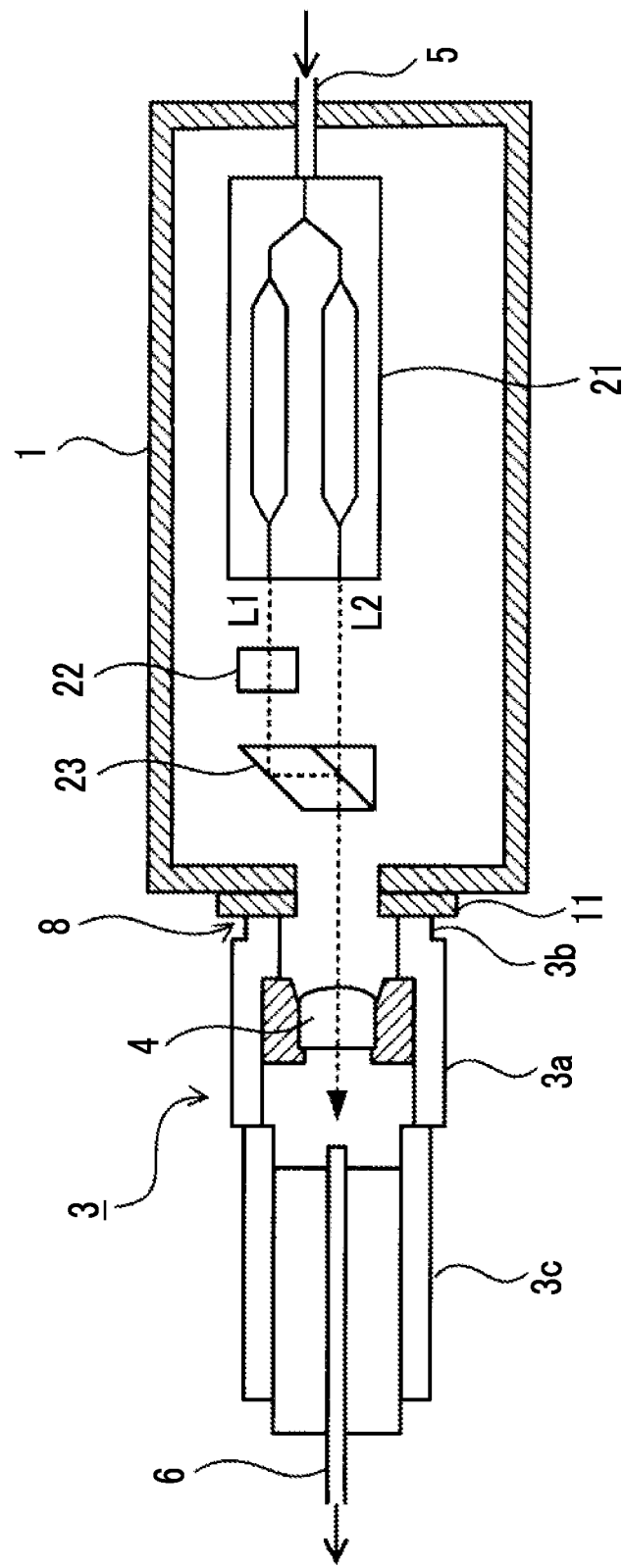
FIG. 4 is a diagram showing a configuration example of the optical element module according to the embodiment of the present invention.

FIG. 4 shows a configuration example of the optical element module according to the embodiment of the present invention. In the example of FIG. 4, an optical modulation element 21 provided with first and second optical modulator units, and polarization combining means (22, 23) for combining two modulated lights which are emitted from the first and second optical modulator units by making planes of polarization orthogonally cross each other are built in the housing 1.

In the optical modulation element 21, the first and second optical modulator units are configured by using, for example, two Mach-Zehnder waveguides disposed in parallel on the same substrate. In the optical modulation element 21, a light wave incident on the optical modulation element 21 from an optical fiber 5 is branched into two lights, which are inputs to the first and second optical modulator units. A modulated light L1 which is emitted from the first optical modulator unit and a modulated light L2 which is emitted from the second optical modulator unit are combined by the polarization combining means and output as one light wave. The polarization combining means is configured of a polarization rotating part 22 such as a half-wave plate which rotates the plane of polarization of the passing light wave by 90 degrees, a polarization beam splitter (PBS) 23 which combines two light waves having planes of polarization orthogonal to each other, and the like. The polarization combining means can also be configured by using a birefringent material.

The optical modulation element 21 and the polarization combining means (22, 23) are disposed and fixed in place in the housing 1. In the optical element module of this example, the optical axis adjustment can be performed while adjusting the light intensities of two light waves (the modulated lights L1 and L2) which are emitted from the first and second optical modulator units of the optical modulation element 21.

An optical system for condensing the light wave emitted from the polarization combining means on the optical fiber 6 by using the collimating lens 4, and the optical axis adjustment thereof are as described with reference to FIG. 2 and FIG. 3 and can also be likewise used for the configuration example of FIG. 4.

The principle that it is possible to perform light intensity adjustment with optical axis adjustment will be described. The light waves (the modulated lights L1 and L2) emitted from the two optical modulator units are combined with the optical axes slightly deviated from each other due to the relationship of a coupling loss or position adjustment of the polarization combining means. For this reason, the optical axes of the two light waves do not completely coincide with each other at a position where they are incident on the optical fiber 6. If the light intensities of these two light waves are viewed in a spatial intensity distribution, a peak on one side appears larger than a peak on the other side. The peak positions of these two light waves are deviated from each other. However, there is also a position where they have the same intensity, and by matching the optical axis of the optical fiber 6 to such a position, it becomes possible to make the light intensities of the combined two modulated lights substantially the same. Of course, it is also possible to realize a state where a light intensity ratio is not equal, such as 1:2 or 1:3.

The reason why the optical axes of the two light waves which are emitted from the polarization combining means are deviated from each other is because the positional relationship between the respective optical elements in the housing 1 is deviated from the normal optical axis, and in a case where such positional deviation occurs, the light intensities of the two light waves can be adjusted suitably. Of course, it goes without saying that the light intensities of the two light waves are changed by adjusting the position of an optical component on the housing 1 side, similar to adjusting the position of the lens 4 or the optical fiber 6.

In the optical axis adjustment, it is also possible to adjust the optical axis by switching and emitting two light waves (the modulated lights L1 and L2) and individually monitor the light intensities. However, the optical axis adjustment may be performed so as to obtain a predetermined light intensity ratio, by performing polarization division of a monitor light and simultaneously detecting the divided lights by two light receiving elements.

Figure 5:
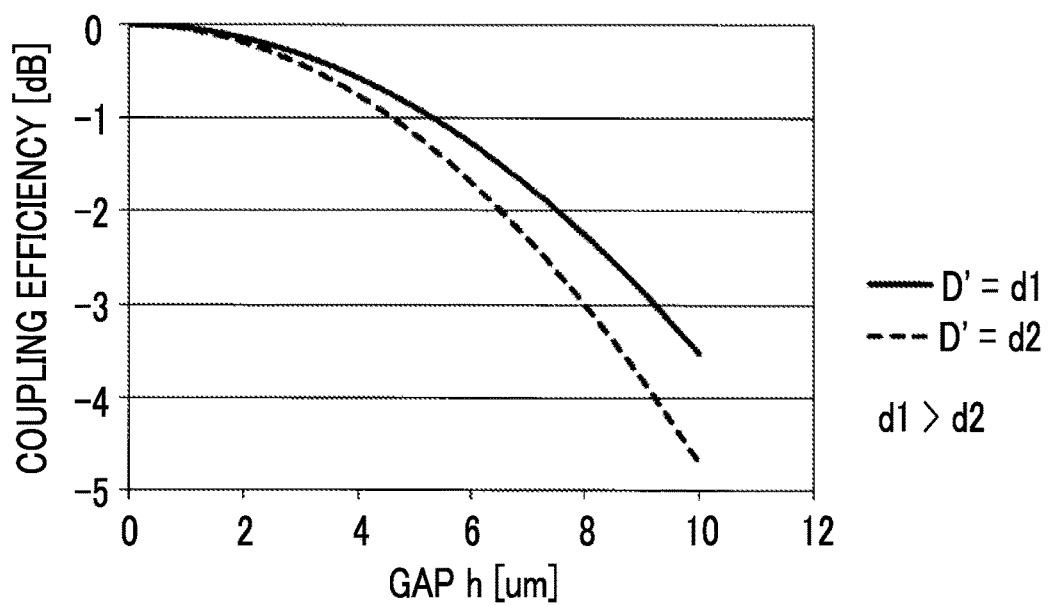
FIG. 5 is a diagram showing a relationship between a holder diameter of the lens holder (a joining place to a housing) and a coupling efficiency to a collimating lens.

FIG. 5 is a diagram showing the relationship between the holder diameter of the lens holder (the joining place to the housing) and a coupling efficiency to the collimating lens. FIG. 5 is a graph showing the results of simulation of the coupling efficiency with respect to each of a case where the holder diameter D' of the joining place of the lens holder to the housing is d1 and a case where the holder diameter D' of the joining place of the lens holder to the housing is d2 (d1>d2). In the graph, the horizontal axis represents a gap (the shrinkage h at the time of welding) [μm], and the vertical axis represents the coupling efficiency [dB]. From the graph, it can be understood that the smaller the holder diameter D' of the joining place, the greater the change in coupling efficiency, in other words, the greater the effect of corrective welding (optical axis adjustment).

The present invention has been described above based on the example. However, the present invention is not limited to the contents described above, and it goes without saying that a design change can be appropriately made within a scope which does not depart from the gist of the present invention.

For example, in the above description, the structure in which the lens holder is joined to the output side of the housing has been described as an example. However, the present invention may be applied to a structure in which the lens holder is joined to the input side of the housing.

According to the present invention, it is possible to provide an optical element module in which it is possible to improve optical axis mobility at the time of adjustment welding while securing the holding ability of a lens holder.

What is claimed is:

1. An optical element module comprising:
an optical modulation element having first and second optical modulator units;
a polarization combining means for combining two modulated lights which are emitted from the first and second optical modulator units, by making planes of polarization orthogonally cross each other;
a housing which houses the optical modulation element and the polarization combining means; and
a lens holder which holds a collimating lens which is disposed between the polarization combining means and an optical fiber, the lens holder further holding the optical fiber,
the optical element module being configured by joining the housing and the lens holder together by welding,
wherein in the lens holder, an outer diameter of a welding place is smaller than an outer diameter of a part which holds the collimating lens.

* * * * *